United States Patent [19]

Havermans

[11] Patent Number: 5,297,145
[45] Date of Patent: Mar. 22, 1994

[54] DIGITAL SUBSCRIBER LINE CIRCUIT FOR CONNECTING AN ISDN SUBSCRIBER TO THE TRUNK SIDE OF A DIGITAL EXCHANGE

[75] Inventor: Gerardus M. J. Havermans, Eindhoven, Netherlands

[73] Assignee: U.S. Philips Corporation, New York, N.Y.

[21] Appl. No.: 896,070

[22] Filed: Jun. 9, 1992

[30] Foreign Application Priority Data

Jun. 14, 1991 [EP] European Pat. Off. ........ 91201478.4

[51] Int. Cl.$^5$ ............................................. H04J 3/06
[52] U.S. Cl. .................................. 370/100.1; 370/60;
370/85.1; 370/105.3; 375/106; 375/108;
375/118
[58] Field of Search ............ 370/60, 85.1, 100.1,
370/101, 105.3; 375/106, 108, 118

[56] References Cited

U.S. PATENT DOCUMENTS

| | | | |
|---|---|---|---|
| 4,833,675 | 5/1989 | Hekimian et al. | 375/118 X |
| 4,839,893 | 6/1989 | Smith | 375/118 X |
| 4,860,285 | 8/1989 | Miller et al. | 370/100.1 |
| 4,965,794 | 10/1990 | Smith | 375/118 X |

Primary Examiner—Douglas W. Olms
Assistant Examiner—Russell Blum
Attorney, Agent, or Firm—David R. Treacy

[57] ABSTRACT

A digital subscriber line circuit for connecting an ISDN subscriber to the trunk side of a digital exchange which comprises an SLD interface operating according to the SLD system. The subscriber line circuit further includes a transfer arrangement for transferring, during a transfer time window, data signals between incoming and outgoing time slots of the SL line of the SLD interface and time slots assigned thereto of outgoing or incoming trunks of the digital exchange. The subscriber line circuit comprises a slip detection means for detecting an incoming or outgoing trunk time slot slipping out of the transfer time window. The slip detection means controls a slip correction means which controls the transfer arrangement in response to the detection of a slip, so that data are skipped in one transfer direction and data are repeated in the other transfer direction.

13 Claims, 2 Drawing Sheets

DIGITAL SUBSCRIBER LINE CIRCUIT FOR CONNECTING AN ISDN SUBSCRIBER TO THE TRUNK SIDE OF A DIGITAL EXCHANGE

BACKGROUND OF THE INVENTION

The invention relates to a digital subscriber line circuit for connecting an ISDN subscriber to the truck side of a digital exchange, comprising an SLD interface operating according to the SLD system and a transfer arrangement for exchanging, during a transfer time window, data signals between incoming and outgoing time slots of a SL line of the SLD interface and time slots assigned thereto of outgoing or incoming trunks (highways) of the digital exchange.

The generally known standard SLD interface has thusfar been used on the extension side of a digital exchange and operates in the so-called "master" mode. In this mode the internal SCL clock signal of the SLD interface controls the timing when SLD data signals are transmitted.

When such an SLD interface is used on the trunk side of a digital exchange, problems arise because the interanl SCL clock signal of the SLD interface, which signal controls the data transmission on the SLD interface, does not synchronize with the digital exchange clock signal which controls the trunk interface on the side of the digital exchange. The problem manifests itself as so-called slip, that is to say, that the time slots of the outgoing or incoming trunks of the digital exchange extend to beyond the transfer time window, so that a correct transfer of data signals between incoming and outgoing time slots of the SL line of the SLD interface and assigned time slots of outgoing or incoming trunks respectively, of the digital exchange is no longer possible. Data losses frequently occur during the slip period.

SUMMARY OF THE INVENTION

It is an object of the invention to provide a digital subscriber line circuit of the type mentioned in the opening paragraph in which the above-described problem is avoided.

According to the invention this object is achieved in that the subscriber line circuit comprises a slip detection means for detecting a slip of a time slot of the incoming or outgoing trunk out of the transfer time window and includes a slip correction means controlled by the slip detection means, which correction means controls the transfer arrangement in response to the detection of a slip, so that data are skipped in one data transfer direction and data are repeated in the other data transfer direction.

This provides the advantage that slip is handled correctly, which means that loss or repetition of data does not change the sequence in which the data are transmitted. In addition, there will be only little data loss and repetition of data in a single slip period.

In a further embodiment of the invention the lower boundary of the transfer time window corresponds to the end of the last data channel in the incoming time slot and the upper boundary thereof corresponds to the beginning of the first data channel in the outgoing time slot of the SL line.

In a still further embodiment of the invention the slip detection reference corresponds to the lower or upper boundary of the transfer time window, the slip detection means producing an output signal when the slip detection reference coincides with the time slot of the trunks, and a slip detection reference switch circuit being available switching, in response to said output signal, the current reference to the other one of the two detection references mentioned above.

When the above is used, data need to be skipped and repeated only once per slip period, so that the data loss and data repetition is minimized.

This minimum is obtained, in that the slip correction means comprises a blocking means blocking the data skipping and data repetition by the transfer arrangement in response to the output signal of the slip detection means in the case where, with a faster system clock signal than the SLD clock signal, the current slip detection reference corresponds to the upper boundary of the transfer time window, or, with a slower clock system signal than the SLD clock signal, the current slip detection reference corresponds to the lower boundary of the transfer time window.

According to an embodiment of the invention the transfer arrangment comprises an SLD register extended to the SLD interface, the register input being supplied with the data signals in the incoming time slots of the SL line and the data signals for the outgoing time slots of the SL line being tapped from its output, and includes a system register extended to the digital exchange, to the output of which system register the outgoing trunk of the digital exchange is connected, the registers being interconnected by two sets of transfer lines, the input of the system register being connected to the output of a switch circuit controlled by the slip correction means, the output of the system register being connected to an input of the switch circuit and the incoming trunk of the digital exchange being connected to another input of the switch circuit.

A simple embodiment of the slip detection and slip correction means are constituted by a first counter which is supplied with the signal available on the SDx line and the SLD interface clock signal derived from that signal, a second counter which is supplied with the clock signal as well as the frame synchronizing signal of the trunks and, connected to the outputs of the counters, by a generator for generating control signals for the shift registers and the switch circuit and in that the generator comprises a comparing circuit for comparing the counts of the counters and includes a circuit for generating the control signals in response to the result of the comparison.

The invention will be further explained in the following with reference to the drawings,

DESCRIPTION OF THE PREFERRED EMBODIMENT

For the connection of Integrated Services Digital Network ISDN subscribers to a digital exchange, digital subscriber line circuits are used which generally comprise SLD interfaces. The standard SLD interface provides half duplex communication of 512 kbit/s with other arrangements which also comprise SLD interfaces. 128 kbit/s of the 256 kbit/s are assigned to speech/data channels also referred to as B channels. The remaining bandwidth is usually used for data in a so-called D channel and various transmissions of control signals and status signals. The SLD interface comprises three lines i.e. the full duplex 28 kbit/s data line to be referenced SLx line hereinafter, the 512 kHz transmission clock signal to be termed SCL clock signal hereinafter, and the 8 kHz data line of to be termed SDx hereinafter.

Figure 1:
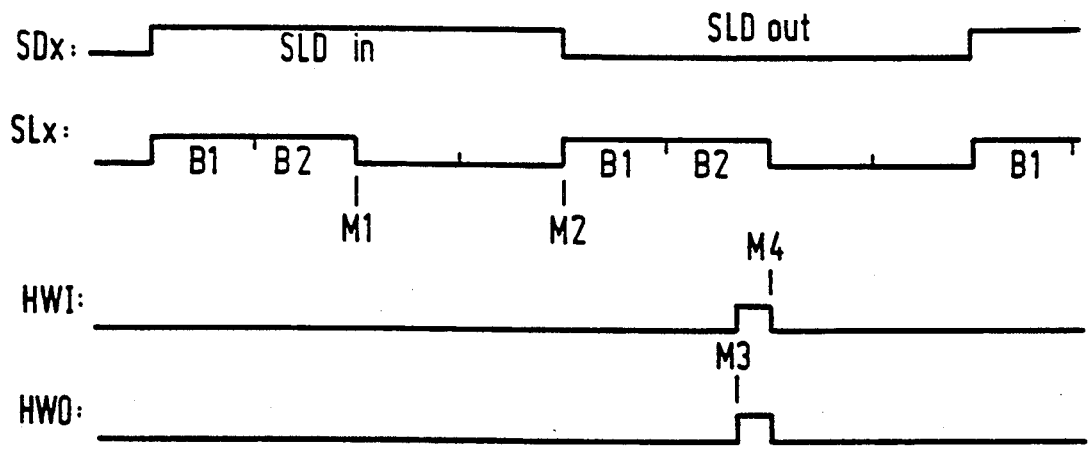
FIG. 1 shows the slip mechanism.

In FIG. 1 the signals on the SLx and SDx lines are represented at the top. The signal on the SDx line defines the period of incoming data SLD in and the period of outgoing data SLD out. On the top-but-one line of FIG. 1 the incoming and outgoing B channels B1 and B2 are shown. The space between the incoming and outgoing B channels is taken up by the D channel and by synchronizing, control and status signals. These signals are not represented, because they are not of importance for comprehending the invention.

Up to now the subscriber line circuit has been used on the extension side and operates as it were in the master mode. The SCL and SDx signals are generated in the subscriber line circuit. If the SDx signal has a low level, the SLx output circuit is released and data are produced.

However, if the prior-art SLD interface is to be used on the trunk side of a digital trunk exchange, the following signals are still to be considered. The 2.048 MHz system clock signal of to be referenced CL clock signal hereinafter, the data signals of the incoming trunk to be referenced HWI signals, the data signals for the outgoing trunk to be referenced HWO signals and the frame synchronizing signal to be referenced FSS signal.

The 2.048 MHz CL clock signal is used as the main clock signal. All the time duration signals in the trunk interface are derived from said clock signal. The FSS signal is used for purposes of timing, that is to say, for denoting the start of a PCM frame.

The B channels of the SLD interfaces are to be multiplexed on the 2 Mbit/s trunks for which a number of time slots are used corresponding to the number of available B channels.

If the prior-art SLD interfaces are used on the trunk side, slip may develop, however. This slip is caused by the asynchronism between the SCL clock signal, the internal clock signal of the SLD interface derived from the SDx signal and which controls the data transmission on the SLD interface, and the system clock signal which controls the trunk interface of the subscriber line circuit. When slip occurs, there is data loss or data repetition. It is evident that slip is to be handled correctly. For this purpose, the slip is controlled simultaneously both in send and receive directions. If slip occurs, data are skipped in one direction and repeated in another direction. It is evident that no slip occurs when the SLD interface is used in the master mode.

FIG. 1 illustrates a possible slip situation.

At the instant M1 the data on the SLx line are available, whereas at the instant M3 this data are necessary for taking over the data available on the SLx line in the time slot of the HWO trunk. At the instant M2 the data are necessary, whereas the data to be taken over from the HWI trunk will not be available until instant M4. A slip with consequent loss of data then occurs.

Figure 2:
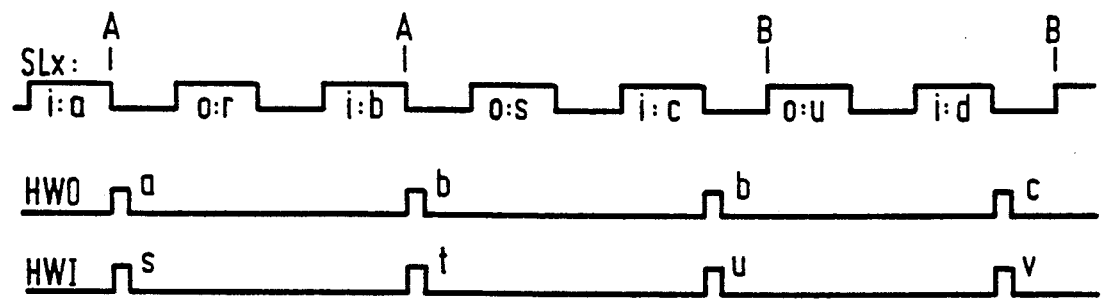
FIGS. 2 and 3 show the data transfer in an embodiment of the invention preferably used for faster trunks than the SLD interface.
Figure 3:
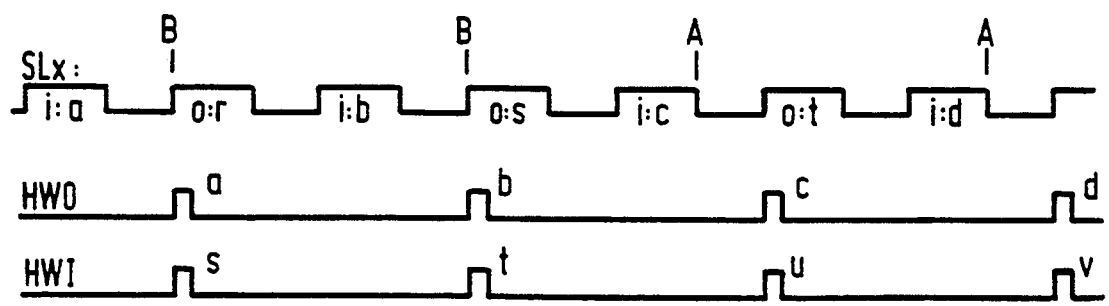

FIGS. 2 and 3 show the transfer mechanism between the SLD system and the digital exchange for the case where the trunk system is faster than the SLD system. This means that the trunk needs more data than the SLD interface can produce.

The first line of the FIGS. 2 and 3 shows the data on the SLx line. Reference character i denotes that the data a, b, c or d are incoming data, whereas the reference character o denotes that the data r, s or u are outgoing data. The lines 2 and 3 of the FIGS. 2 and 3 show the data signals on the trunks HWO and HWI respectively.

For the data transfer between the SL line and the trunks, use is made of the transfer arrangement to be described hereinafter which utilizes a transfer time window. In the embodiment shown the transfer time window is selected to be the space between the incoming and outgoing data of the SLx line, that is to say, the lower boundary of the transfer time window corresponds to the end (M2 of FIG. 1) of the last data channel B2 in the incoming time slot, and its upper boundary to the beginning (M2 in FIG. 1) of the first data channel B1 in the outgoing time slot of the SLx line.

For correctly handling a case of slip, the subscriber line circuit comprises a slip detection and slip correction means which will be discussed hereinafter. "Slipping" out of the transfer time window by one of the allocated time slots of the trunks is used as a criterion for slip. When a slip is detected in the slip detection and slip correction means, it is corrected in that data are skipped in one data transfer direction, whereas in the other direction data are repeated. Consequently, the data transmission sequence is not disturbed.

For explaining the handling of the slip phenomenon it is assumed that in the first instance with the slip detection the slip detection reference is situated near the lower boundary of the transfer time window. According to FIG. 2 the data i:a of the SLx line is multiplexed as data a on the HWO trunk. The data s on the HWI trunk is taken over in the time slot o:s.

The trunks are faster than the SLDx line, so that as it were the time slots of the trunks shift to the left relative to those of the SLx lines. At a specific instant the time slots of the trunks will thus slip out of the time window as it were. With the second slip detection reference A on the SLx line there is a threat that this happens. When the time slots of the trunks are too close to the detection reference, a slip is detected. In response to this detection the data b from the time slot i:b of the SLx line is repeated on the trunk HWO, which is denoted by the second reference character b on the trunk HWO. Simultaneously, the data t on the trunk HWI is skipped. Subsequently, it is to be avoided that a skipping and a repetition of data again occurs, which is preferably achieved in that the slip detection reference A is switched to the slip detection reference B near the upper boundary of the transfer time window. The detection instant is shifted as it were. After a specific period of time, which depends on the speed difference i.e. the asynchronism between the SLD system and the trunk system, the time slots of the trunks again approach the slip detection reference B. This is shown in FIG. 3. Initially, no slip is detected, so that the data i:a is multiplexed as data a on the trunk HWO. The incoming data s on the trunk HWI ends in the time slot o:s of the SLx line. If it is assumed that, subsequently, a collision between the slip detection reference (second B) and the time slot b, t of the trunks is detected, no data need yet to be skipped or repeated. Therefore, the slip correction means preferably comprises a blocking means blocking the skipping of data by the transfer arrangement.

By means of said measures there is achieved that data are skipped and repeated only once per slip period, whereas the data transmission sequence is retained as has been described hereinbefore.

Figure 4:
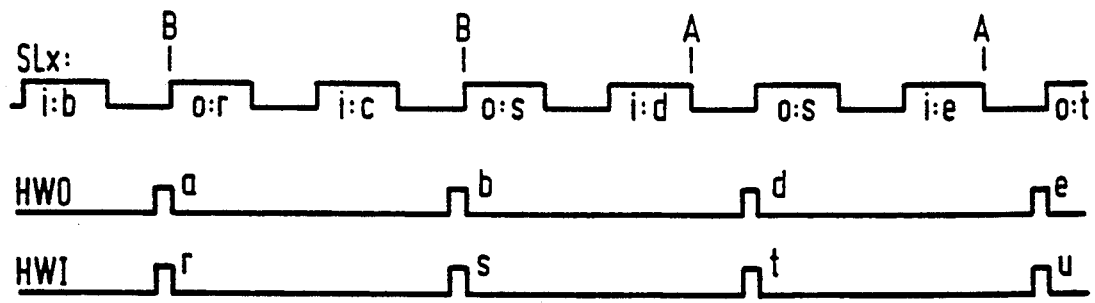
FIGS. 4 and 5 show equivalent embodiments to FIGS. 2 and 3 with slower trunks than the SLD interface.
Figure 5:
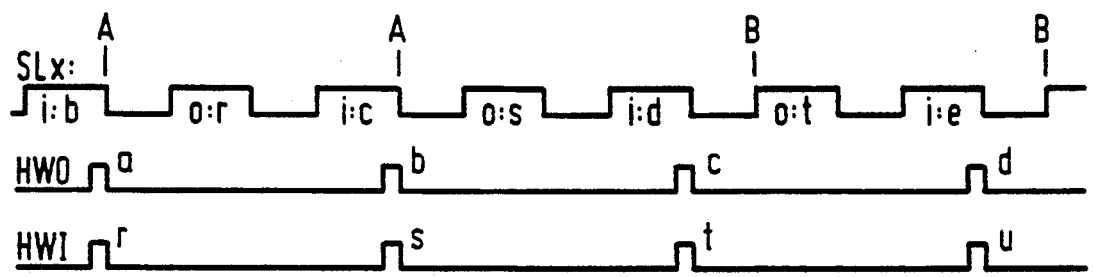

FIGS. 4 and 5 show the situations in which the trunks are slower than the SLx line. The time slots of the trunks slip as it were to the right out of the transfer time window. According to FIG. 4 the data i:c is skipped, whereas the data o:s is repeated. In FIG. 5, which as it were is an extension to FIG. 4, no data are skipped or repeated. The reference characters of FIGS. 4 and 5 corresponding to those of the FIGS. 2 and 3 show data between the SLx line and the trunks being transferred or exchanged as well as the change-over of the slip detection reference and the consequent data skipping and data repetition.

Figure 6:
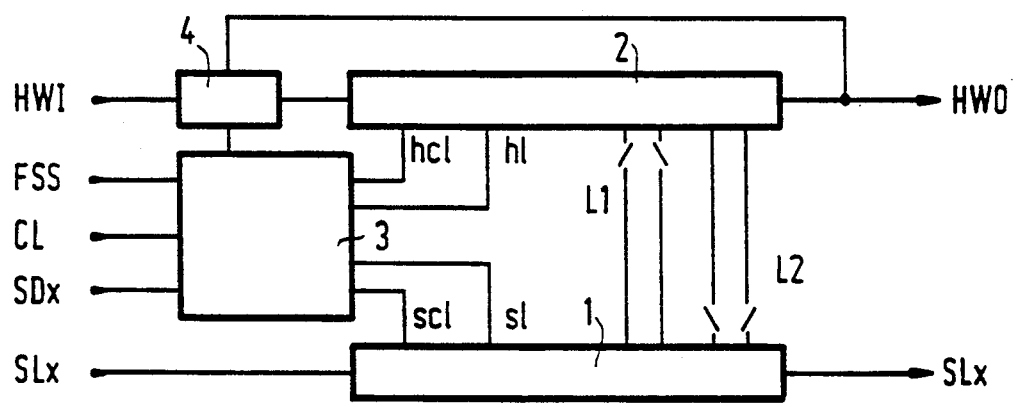
FIG. 6 shows a block diagram of an embodiment according to the invention of a subscriber line circuit.

FIG. 6 shows an embodiment of the invention of a circuit by means of which slip is correctly combatted. This circuit will be called slip buffer hereinafter.

The slip buffer comprises a transfer arrangement constituted by an SLD register 1 extended to the SLD interface. The data signals are applied to the input of this shift register in the incoming time slots of the SLx line, whereas the data signals for the outgoing time slots of the SLx line can be tapped from the output of said register 1. The digital exchange is extended by the system register 2 arranged as a shift register, the output of the system register being connected to the outgoing trunk of the digital exchange. The two registers are interconnected by two sets of transfer lines L1 and L2. The input of the system register 2 is connected to the output of a switch circuit 4 controlled by the slip detection and slip correction means 3. One input of the switch circuit 4 is connected to the output of the system register 2, whereas the other input of said switch circuit is connected to the incoming trunk of the digital exchange. The switch circuit 4 may have the form of a multiplexer.

The slip detection and slip correction means 3 are supplied with the FSS signal, the CL clock signal and the SDx signal. The slip detection reference is derived from these signals and relative to this reference value there is detected whether slip occurs. For a correct handling of slip the clock signals hcl and scl and load signals hl and sl for the registers 2 and 1 respectively, are generated.

The circuit described above operates as follows.

The incoming data coming in on the line SLx and the incoming data coming in on the trunk HWI are stored in the shift registers 1 and 2 respectively, and subsequently transferred via the transfer lines L1 and L2 respectively. However, if slip is detected, data are skipped in one direction, whereas in the other direction data are repeated by means of the feedback from the trunk HWO through the switch circuit 4. This switch circuit is controlled by the slip detection and slip correction means 3.

Figure 7:
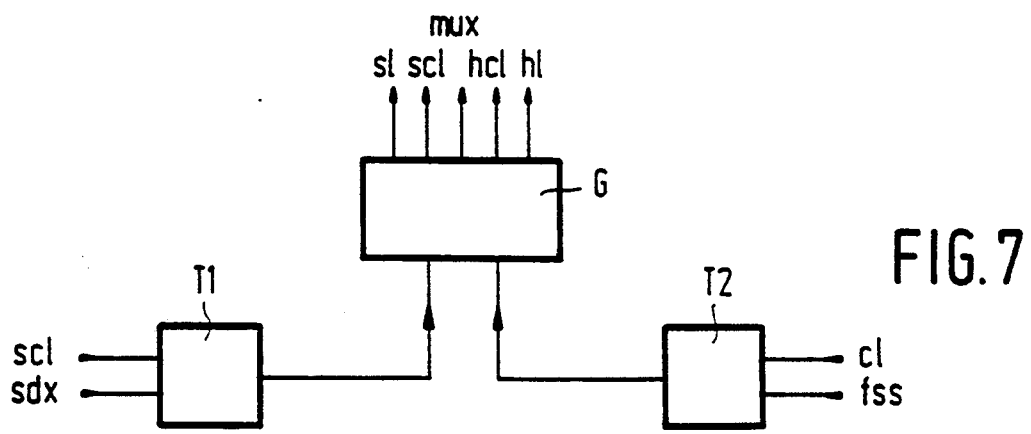
FIG. 7 shows a simple embodiment of the slip detection and slip correction means according to the invention.

A simple embodiment of the slip detection and slip correction means is shown in FIG. 7. This circuit comprises a first counter T1 to which the clock signal scl is applied which is derived from the signal occurring on the line SDx. Then this counter T1 is supplied with the signal sdx occurring on the line SDx, while the counter is preset by the ascending edge of this signal sdx. Furthermore, a second counter T2 is present, which is supplied with the clock signal cl of the incoming and outgoing trunks. This counter is preset by the frame synchronizing signal of the trunks HWI and HWO.

The outputs of the counters T1 and T1 are fed to a comparing circuit for comparing the counts of said counters. This comparing circuit is included in the generator G for generating control signals for the shift registers 1 and 2 and the switch circuit 4. By means of the comparing circuit there is established whether there is a threat of slip occuring or not. Depending on the result of the comparison the control signals sl, scl, hcl and hl for the registers 1 and 2 as well as the control signal mux for the circuit 4 are derived.

It will be evident that the detailed implementation of the circuit blocks shown in the drawing FIGS. may be effected in various manners and may be devised by any person skilled in the art.

I claim:

1. A digital subscriber line circuit for connecting an ISDN subscriber to the trunk side of a digital exchange, comprising:

an SLD interface operating according to the SLD system, and a transfer arrangement for exchanging, during a transfer time window, data signals between incoming and outgoing time slots of a SL line of the SLD interface and time slots assigned thereto of outgoing or incoming trunks of the digital exchange, characterized in that said transfer time window has a lower boundary corresponding to the end of the last data channel in the incoming time slot of the SL line, and an upper boundary corresponding to the beginning of the first data channel in the outgoing time slot of the SL line, and the subscriber line circuit comprises a slip detection means for detecting a slip of a time slot of the incoming or outgoing trunk out of the transfer time window, and a slip correction means controlled by the slip detection means, for controlling the transfer arrangement in response to detection of a slip, to skip data in one data transfer direction and to repeat data in the other data transfer direction.

2. A digital subscriber line circuit for connecting an ISDN subscriber to the trunk side of a digital exchange, comprising:

an SLD interface operating according to the SLD system, and a transfer arrangement for exchanging, during a transfer time window having a lower boundary and upper boundary, data signals between incoming and outgoing time slots of a SL line of the SLD interface and time slots assigned thereto of outgoing or incoming trunks of the digital exchange, characterized in that the subscriber line circuit comprises a slip detection means for detecting a slip of a time slot of the incoming or outgoing trunk out of the transfer time window with respect to a slip detection reference, said slip detection reference being one of said boundaries of the transfer time window, said slip detection means comprising means producing an output signal when the slip detection reference coincides with the time slot of the trunks, and a slip detection reference switch circuit for switching, in response to said output signal, the slip detection reference to the other one of the said boundaries, and a slip correction means controlled by the slip detection means, for controlling the transfer arrangement in response to detection of a slip, to skip data in one data transfer direction and to repeat data in the other data transfer direction.

3. A subscriber line circuit as claimed in claim 2, characterized in that said transfer time window has a lower boundary corresponding to the end of the last data channel in the incoming time slot of the SL line, and an upper boundary corresponding to the beginning of the first data channel in the outgoing time slot of the SL line.

4. A subscriber line circuit as claimed in claim 2, characterized in that the slip correction means comprises a blocking means blocking the data skipping and data repetition by the transfer arrangement in response to the output signal of the slip detection means in the case where, with a faster system clock signal than the SLD clock signal, the current slip detection reference corresponds to the upper boundary of the transfer time window, or, with a slower system clock signal than the SLD clock signal, the current slip detection reference corresponds to the lower boundary of the transfer time window.

5. A subscriber line circuit as claimed in claim 2 characterized in that the transfer arrangement comprises an SLD register extended to the SLD interface, the register input being supplied with the data signals in the incoming time slots of the SL line and the data signals for the outgoing time slots of the SL line being tapped from its output, and includes a system register extended to the digital exchange, to the output of which system register the outgoing trunk of the digital exchange is connected, the registers being interconnected by two sets of transfer lines, the input of the system register being connected to the output of a switch circuit controlled by the slip correction means, the output of the system register being connected to an input of the switch circuit and the incoming trunk of the digital exchange being connected to another input of the switch circuit.

6. A subscriber line circuit as claimed in claim 5, characterized in that the slip detection and slip correction means are constituted by a first counter which is supplied with the signal available on an $SD_x$ line and an SLD interface clock signal derived from that signal, a second counter which is supplied with a system clock signal as well as a frame synchronizing signal of the trunks and, connected to the outputs of the counters, by a generator for generating control signals for the shift registers and the switch circuit, and in that the generator comprises a comparing circuit for comparing the counts of the counters and includes a circuit for generating the control signals in response to the result of the comparison.

7. A subscriber line circuit as claimed in claim 1, characterized in that the transfer arrangement comprises an SLD register extended to the SLD interface, the register input being supplied with the data signals in the incoming time slots of the SL line and the data signals for the outgoing time slots of the SL line being tapped from its output, and includes a system register extended to the digital exchange, to the output of which system register the outgoing trunk of the digital exchange is connected, the registers being interconnected by two sets of transfer lines, the input of the system register being connected to the output of a switch circuit controlled by the slip correction means, the output of the system register being connected to an input of the switch circuit and the incoming trunk of the digital exchange being connected to another input of the switch circuit.

8. A subscriber line circuit as claimed in claim 7, characterized in that the slip detection and slip correction means are constituted by a first counter which is supplied with the signal available on an $SD_x$ line and an SLD interface clock signal derived from that signal, a second counter which is supplied with a system clock signal as well as a frame synchronizing signal of the trunks and, connected to the outputs of the counters, by a generator for generating control signals for the shift registers and the switch circuit, and in that the generator comprises a comparing circuit for comparing the counts of the counters and includes a circuit for generating the control signals in response to the result of the comparison.

9. A subscriber line circuit as claimed in claim 4, characterized in that the transfer arrangement comprises an SLD register extended to the SLD interface, the register input being supplied with the data signals in the incoming time slots of the SL line and the data signals for the outgoing time slots of the SL line being tapped from its output, and includes a system register extended to the digital exchange, to the output of which system register the outgoing trunk of the digital exchange is connected, the registers being interconnected by two sets of transfer lines, the input of the system register being connected to the output of a switch circuit controlled by the slip correction means, the output of the system register being connected to an input of the switch circuit and the incoming trunk of the digital exchange being connected to another input of the switch circuit.

10. A subscriber line circuit as claimed in claim 9, characterized in that the slip detection and slip correction means are constituted by a first counter which is supplied with the signal available on an $SD_x$ line and an SLD interface clock signal derived from that signal, a second counter which is supplied with said system clock signal as well as a frame synchronizing signal of the trunks and, connected to the outputs of the counters, by a generator for generating control signals for the shift registers and the switch circuit, and in that the generator comprises a comparing circuit for comparing the counts of the counters and includes a circuit for generating the control signals in response to the result of the comparison.

11. A subscriber line circuit as claimed in claim 3, characterized in that the slip correction means comprises a blocking means blocking the data skipping and data repetition by the transfer arrangement in response to the output signal of the slip detection means in the case where, with a faster system clock signal than the SLD clock signal, the current slip detection reference corresponds to the upper boundary of the transfer time window, or, with a slower system clock signal than the SLD clock signal, the current slip detection reference corresponds to the lower boundary of the transfer time window.

12. A subscriber line circuit as claimed in claim 11, characterized in that the transfer arrangement comprises an SLD register extended to the SLD interface, the register input being supplied with the data signals in the incoming time slots of the SL line and the data signals for the outgoing time slots of the SL line being tapped from its output, and includes a system register extended to the digital exchange, to the output of which system register the outgoing trunk of the digital exchange is connected, the registers being interconnected by two sets of transfer lines, the input of the system register being connected to the output of a switch circuit controlled by the slip correction means, the output of the system register being connected to an input of the switch circuit and the incoming trunk of the digital exchange being connected to another input of the switch circuit.

13. A subscriber line circuit as claimed in claim 12, characterized in that the slip detection and slip correction means are constituted by a first counter which is supplied with the signal available on an SDx line and an SLD interface clock signal derived from that signal, a second counter which is supplied with said system clock signal as well as a frame synchronizing signal of the trunks and, connected to the outputs of the counters, by a generator for generating control signals for the shift registers and the switch circuit, and in that the generator comprises a comparing circuit for comparing the counts of the counters and includes a circuit for generating the control signals in response to the result of the comparison.

* * * * *